United States Patent
Suzuki et al.

(10) Patent No.: US 6,982,017 B2
(45) Date of Patent: Jan. 3, 2006

(54) METHOD FOR CONTROLLING DEFLECTION OF SUBSTRATES BY TEMPERATURE

(75) Inventors: Takayuki Suzuki, Yachiyo (JP); Masahiro Nakamura, Saitama (JP); Tsuyoshi Wakahira, Tokyo (JP); Hideo Kobayashi, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 0 days.

(21) Appl. No.: 10/769,301

(22) Filed: Jan. 30, 2004

(65) Prior Publication Data

US 2005/0139306 A1    Jun. 30, 2005

(30) Foreign Application Priority Data

Dec. 26, 2003    (JP)    ............................. 2003-433599

(51) Int. Cl.
*B32B 31/26*    (2006.01)
*B32B 31/28*    (2006.01)

(52) U.S. Cl. ................... 156/64; 156/275.5; 156/275.7

(58) Field of Classification Search .................. 156/64, 156/359, 378, 379, 275.5, 275.7; 369/286; 29/738; 700/206, 207

See application file for complete search history.

(56) References Cited

U.S. PATENT DOCUMENTS

| 6,013,145 A | * | 1/2000 | Amo et al. | ................... 156/74 |
|---|---|---|---|---|
| 6,457,882 B2 | | 10/2002 | Ogata et al. | |
| 6,605,179 B1 | | 8/2003 | Higaki et al. | |
| 6,619,358 B2 | * | 9/2003 | Murphy | ...................... 156/359 |
| 6,733,606 B2 | * | 5/2004 | Miyamoto et al. | ............ 156/74 |
| 2004/0000368 A1 | * | 1/2004 | Kasuga et al. | ................ 156/64 |

FOREIGN PATENT DOCUMENTS

| JP | 05-020714 | 1/1993 |
|---|---|---|
| JP | 10-199053 | 7/1998 |
| JP | 11-238259 | 8/1999 |
| JP | 2000-076710 | 3/2000 |
| JP | 2001-232666 | 8/2001 |
| JP | 2003-099985 | 4/2003 |

* cited by examiner

*Primary Examiner*—George Koch
(74) *Attorney, Agent, or Firm*—Kolisch Hartwell, P.C.

(57) ABSTRACT

A substrate consisting of a plurality of individual substrates and a photo-curable adhesive layer interposed therebetween is irradiated by a curing light, and the deflection of the substrate is controlled by controlling the temperature. The step for controlling the deflection includes the steps of finding the temperature difference ΔT between the temperature Th of a mounting table and the temperature Td of the substrates before curing; finding deflection difference ΔX between the deflection X of the substrates after curing and the target deflection setting value Xt; finding the temperature Tc by Tc=ΔT−M×ΔX by using the constant of proportionality M; and controlling the temperatures of at least one of the substrates before curing and the mounting table according to the temperature Tc such that Tc=Th−Td.

20 Claims, 11 Drawing Sheets

RELATIONSHIP BETWEEN DEFLECTION X OF SUBSTRATES AND TEMPERATURE Th OF MOUNTING TABLE

METHOD FOR CONTROLLING DEFLECTION OF SUBSTRATES BY TEMPERATURE

BACKGROUND OF THE INVENTION

1. Field of the Invention

The present invention relates to a method and apparatus for processing substrates while controlling the deflection (amount of warping or tilt angle) that occurs in the substrates during bonding of the individual substrates of, for example, optical disc substrates so as to attain a desired deflection.

Priority is claimed on Japanese Patent Application No. 2003-433599, filed Dec. 26, 2003, the content of which is incorporated herein by reference.

2. Description of Related Art

An optical disc for a DVD is known wherein two individual substrates having a recording layer, or one individual substrate having a recording layer and one individual substrate not having a recording layer, or an individual substrate having a recording layer and a sheet film, or one individual substrate and another individual substrate (here, these are also referred to as "individual substrates") are bonded together by having interposed a photo-curable adhesive layer therebetween (for example, refer to Japanese Unexamined Patent Application, First Publication No. Hei 5-20714).

To read the data recorded on an optical disc or to record the data on an optical disc, the optical disc is irradiated externally by a laser while the optical disc is rotated, and the laser irradiates the recording layer by penetrating the transparent substrates of the optical disc. Because the recording density of the optical disc is extremely high, the laser must irradiate the recording layer with high precision. If the flatness of the optical disc is substandard, naturally the flatness of the recording layer will also become substandard. The laser will not be able to irradiate the recording layer in correct alignment with a predetermined position, and errors will occur when writing and reading the data. For this reason, when manufacturing the optical disc, generally there must not be warping or distortion and that a high degree of flatness can be maintained.

Various inventions have been proposed as methods for decreasing such warping during the manufacture of an optical disc. In one of these, a method is proposed in which the heat of the substrates, whose temperature has risen due to the irradiation of the curing light during the bonding of the individual substrates, is dissipated into the mounting table on which the substrates is mounted. After the ambient temperature and the temperature of the substrates have become substantially equal, the substrates are removed from the mounting table. In this method, this mounting table is cooled by using a cooling medium such as air or cooled water, and thereby the temperature of this cooling medium is controlled (for example, refer Japanese Unexamined Patent Application, First Publication No. Hei 10-199053).

Another method has been proposed wherein the mounting table on which the substrates are mounted is cooled so as to maintain a constant temperature (for example, refer to Japanese Unexamined Patent Application, First Publication No. 2003-99985).

In another invention that decreases the warping during the manufacturing of an optical disc described above have been proposed. The invention includes a method has been proposed wherein the temperature of at least one of the surfaces of the substrates is controlled while the photo-curable adhesive layer interposed between the individual substrates of the optical disc is being cured, and thereby the temperature of both surfaces is controlled; a method has been proposed wherein the temperature of the substrates is controlled, and thereby the temperature distribution in both directions of the substrates is made uniform; and an apparatus has been proposed that provides a temperature control device that can adjust the surface temperature of a mounting table (for example, refer to Japanese Unexamined Patent Application, First Publication No. 2000-76710).

However, due to increasing the flatness of the optical disc because of implementing the methods described above during manufacture of the optical disc, even if the optical disc possesses the required flatness immediately after its manufacture, during the subsequent storage, management, and distribution, the optical disc may warp in a predictable manner. For example, warping may occur due to label printing after bonding. In such a case, it is necessary to control the warping of the optical disc by taking into account the warping of such an optical disc during the final usage, and compensating warping must be intentionally applied to the optical disc so that almost no warping is present during the final usage.

In consideration of the problems described above, it is an object of the present invention to control the deflection (tilt angle) of the optical disc during manufacture so as to attain a target deflection.

SUMMARY OF THE INVENTION

In the processing method and processing apparatus for the substrates of the present invention, the temperature difference $\Delta T° C.$ ($=Th-Td$) is found between measured temperature Td of the substrates consisting of a plurality of superposed individual substrates after interposing an uncured photo-curable adhesive layer therebetween and the measured temperature Th of a mounting table on which these substrates are mounted, and at the same time the measured deflection X (deg) of the substrates is found, and a plurality of these ($\Delta T$ and X) are plotted. The result thereof is a straight line that represents a linear function, and the slope thereof is the constant of proportionality M (° C./deg).

Using this constant of proportionality M, when one or both of a mounting table and the substrates are temperature controlled using the control temperature found by calculating according to the equation $(Th-Td)-M\times(\Delta X \text{ or } \Delta X')$ or the equation $Th-M\times(\Delta X \text{ or } \Delta X')$, it is possible to obtain substrates having a desired warping. Xt is the target deflection for the substrates and X is the measured deflection. In addition, $\Delta X = Xt - X$, and $\Delta X'$ is the compensated value obtained by compensating $\Delta X$. This compensation is carried out by taking into account the tendency of $\Delta X$ or the like, for example, whether or not the direction of the increase or decrease is increasing or decreasing according to a linear, second order, or a higher order curve.

According to the substrate processing method and processing apparatus of the present invention, it is possible to provide a substrate consisting of bonded individual substrates having a desired deflection (tilt angle).

DETAILED DESCRIPTION OF THE INVENTION

First, the new insight on which the present invention is based will be explained before explaining a first embodiment of the preferred configuration for implementing the present invention.

Figure 1:
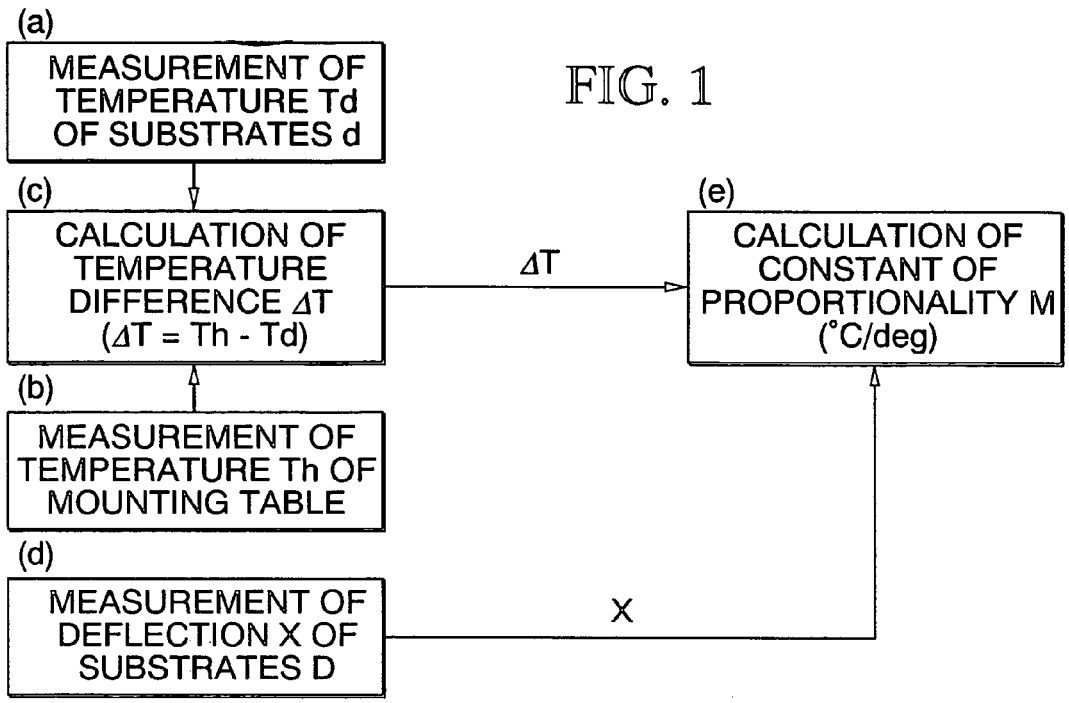
FIG. 1 is a drawing for explaining the insight on which the present invention is based, and shows the method for finding the constant of proportionality M (° C./deg).
Figure 12:
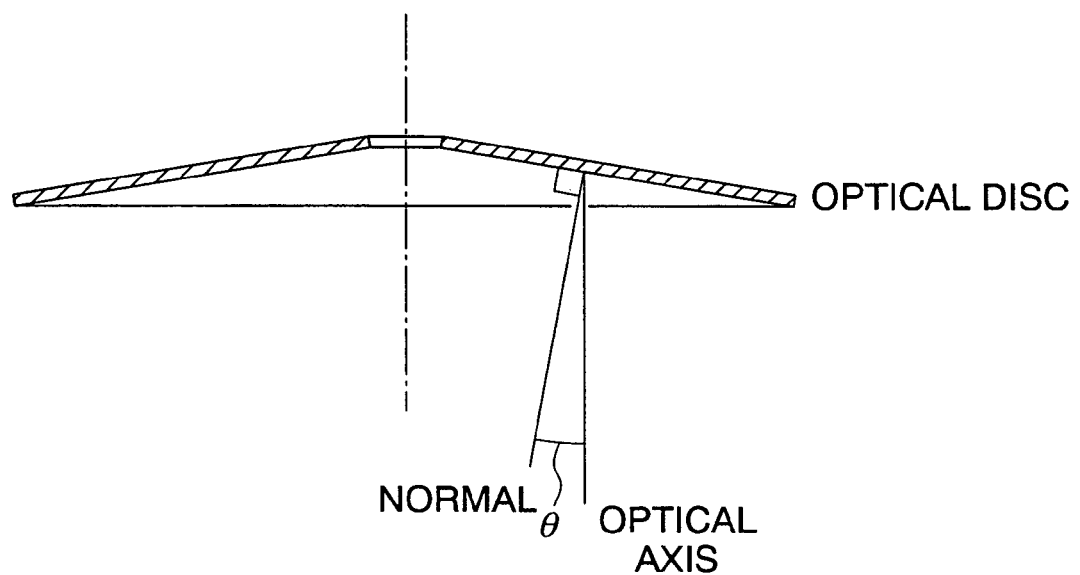
FIG. 12 is a cross-sectional drawing of the substrates showing the definition of the deflection.

As shown in FIG. 1, the inventors of the present invention (a) measured the temperature Td of the optical disc substrates (below, referred to as the "substrates") before being mounted on the mounting table, where the substrates consisting of a plurality of individual substrates superposed after interposing an uncured photo-curable adhesive layer therebetween. In addition, the inventors (b) measured the temperature Th of the mounting table on which the substrates are mounted before irradiating a curing light such as UV light. As shown in FIG. 1, the inventors (c) found the temperature difference $\Delta T$ (° C.)(=Th−Td) between the temperature Td and the temperature Th, and (d) found the deflection X (deg) of the substrates D after curing when the temperature has substantially fallen to room temperature after curing the photo-curable adhesive layer by irradiating a curing light on the substrates before curing. Note that, as shown in FIG. 12, the deflection (tilt angle) denotes the angle θ formed by the normal that is perpendicular to the recording surface of the substrates and the axis of the optical system.

Figure 2:
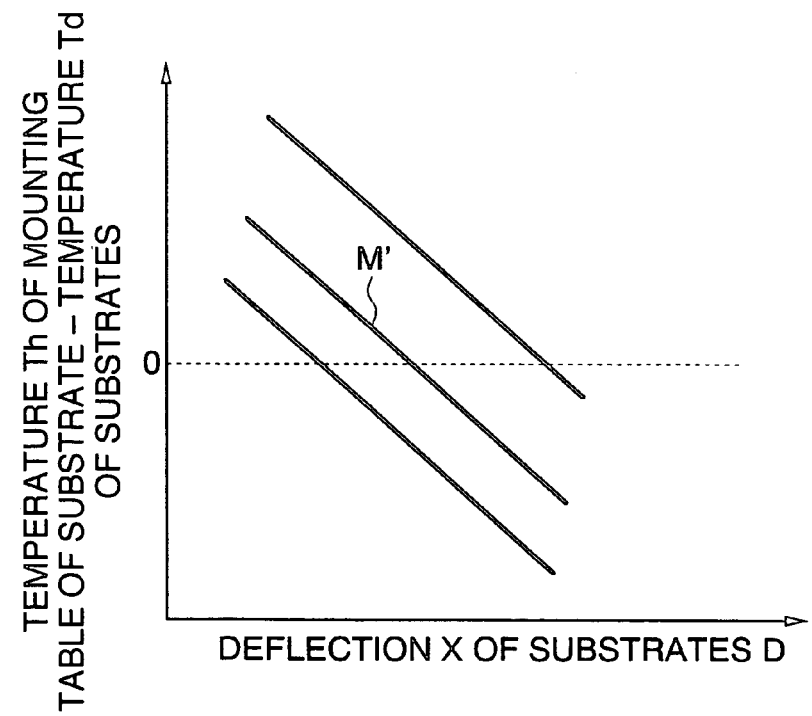
FIG. 2 is a drawing showing the relationship between Th−Td, and the deflection X of the substrates, where Th is the temperature of the mounting table for the substrates and Td is the temperature of the substrates.

The basic insight was attained that, for a plurality of substrates, as shown in FIG. 2, the results of (e) plotting of the deflection X (deg) and the plurality of temperature differences $\Delta T$ (° C.) show that the relationship between the deflection X and the temperature difference $\Delta T$ fits a linear function M', which is a substantially proportional relationship. The slope of this linear function M' serves as the constant of proportionality M (° C./deg). Based on many experimental results, a section of the linear function M' changes depending on the condition of the warping of the bonded individual substrates, but the slope, that is, the constant of proportionality M, is substantially unchanged. Therefore, it was confirmed that by using the constant of proportionality M and the linear function M', when controlling the difference between the temperature of a mounting table and temperature of the substrates, the deflection (tilt angle) of the substrates can attain a desired value by using this temperature difference. In particular, by using a constant of proportionality M within a range from 15 (° C./deg) to 40 (° C./deg), that is, 15 (° C./deg)≦M≦40 (° C./deg), the deflection of the bonded substrates can attain a desired value in a short period of time.

Embodiment 1

Figure 3:
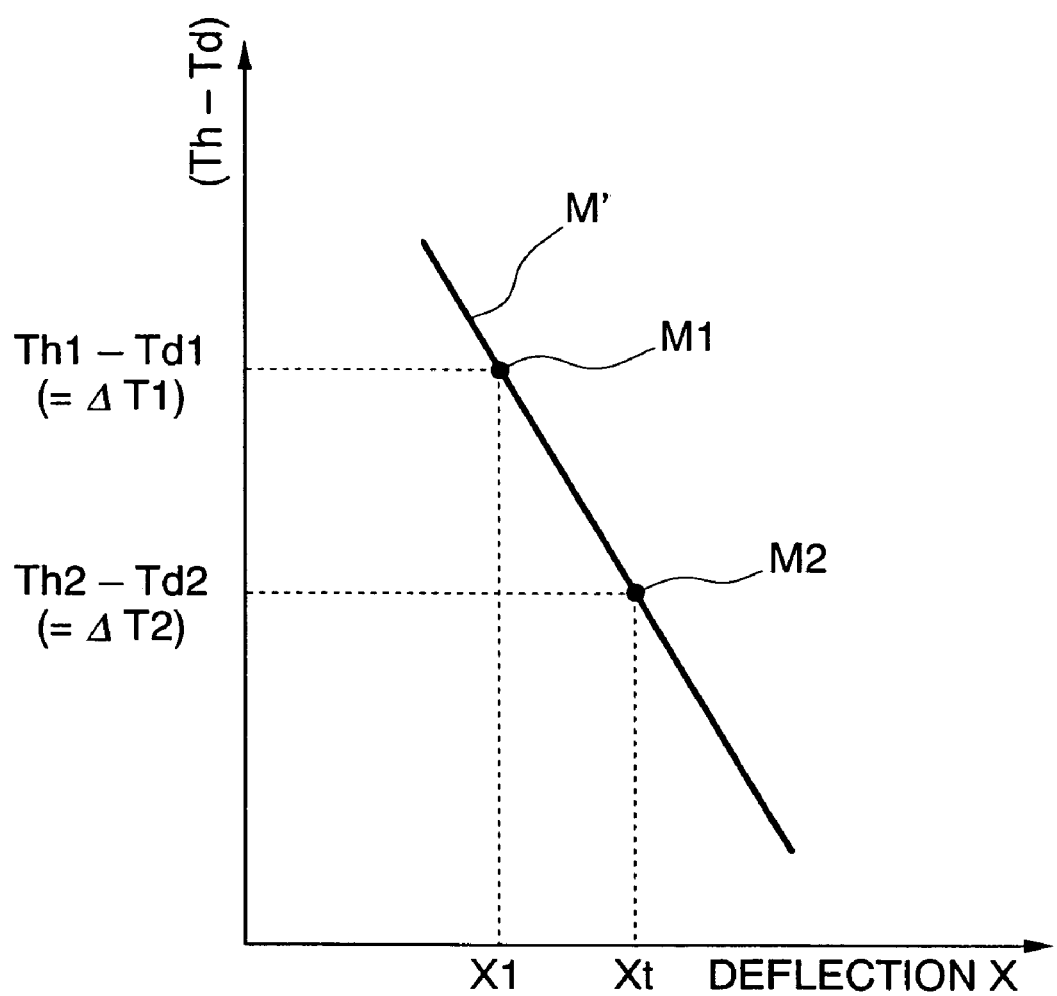
FIG. 3 is a drawing for explaining the basic conception of the present invention.
Figure 4:
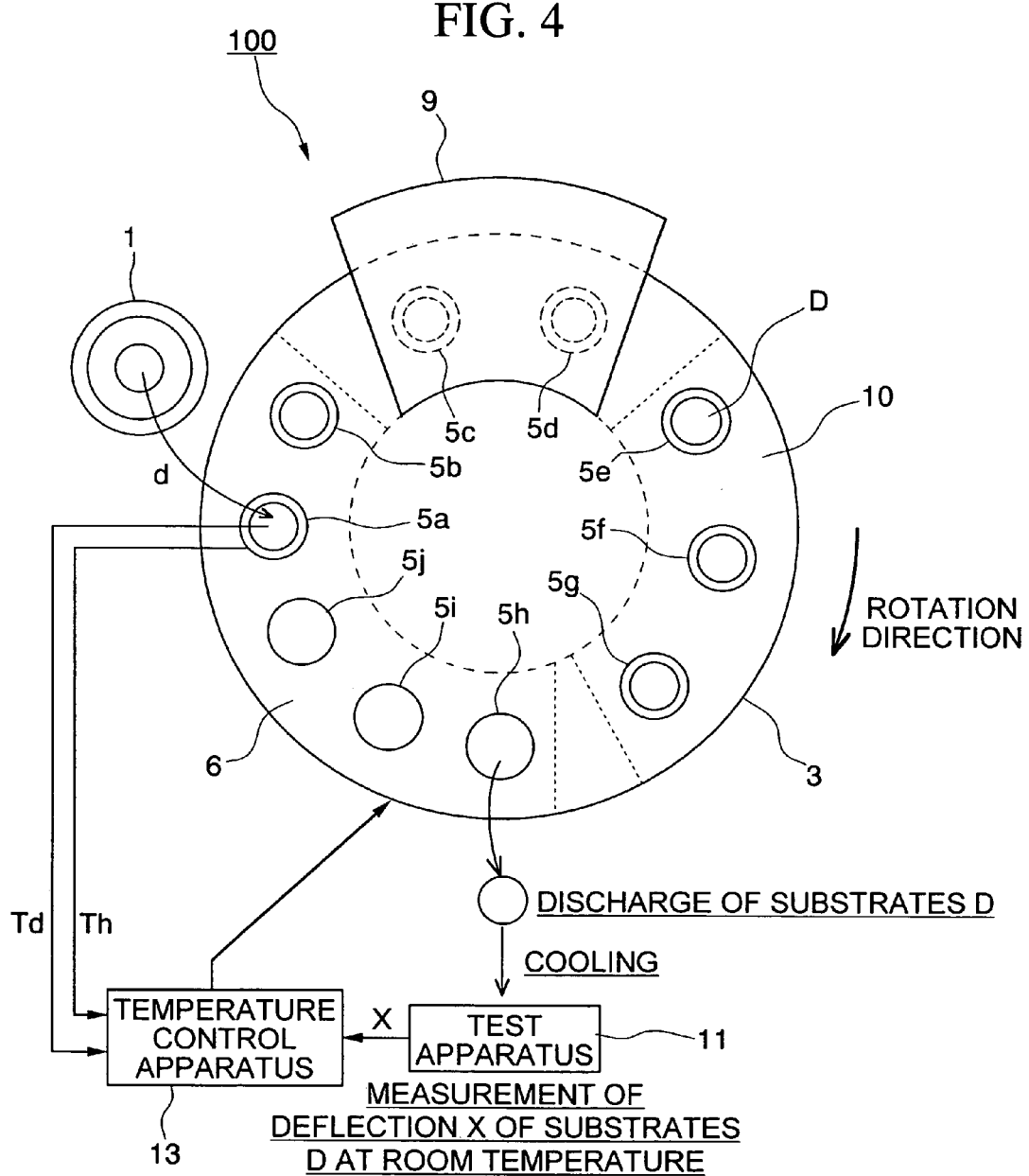
FIG. 4 is a drawing showing part of the bonding line 100 of the optical disc substrates that is an embodiment of the present invention.
Figure 5:
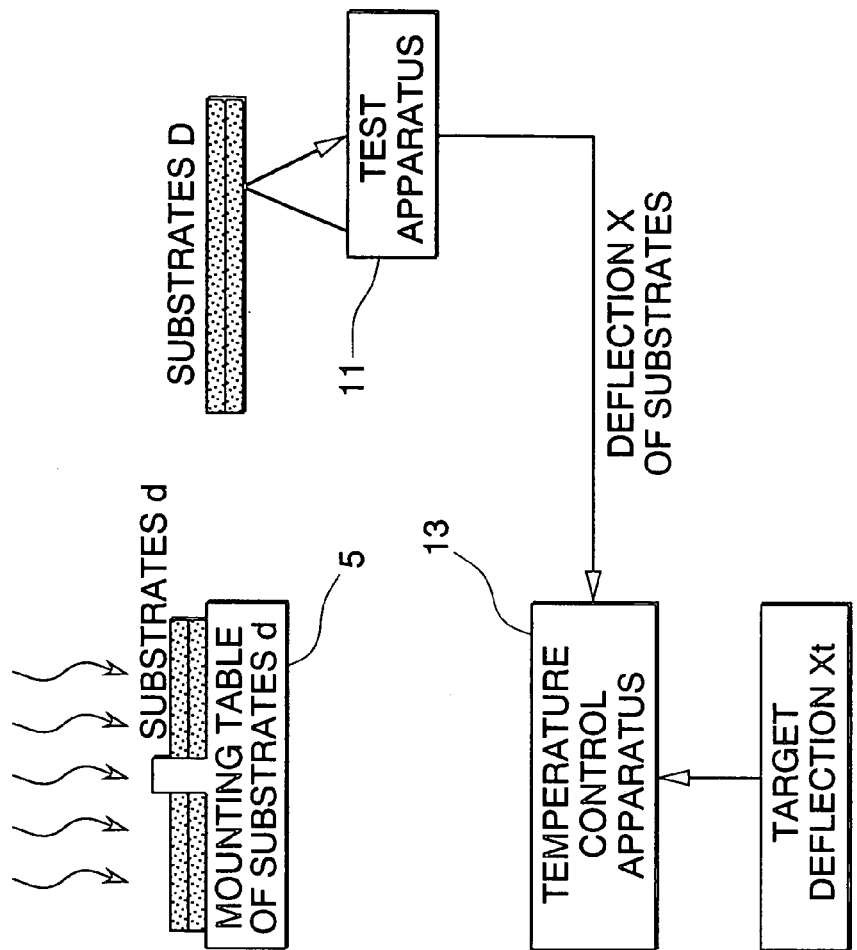
FIG. 5 is a drawing showing the basic arrangement of the structure for controlling the deflection of the substrates.
Figure 6:
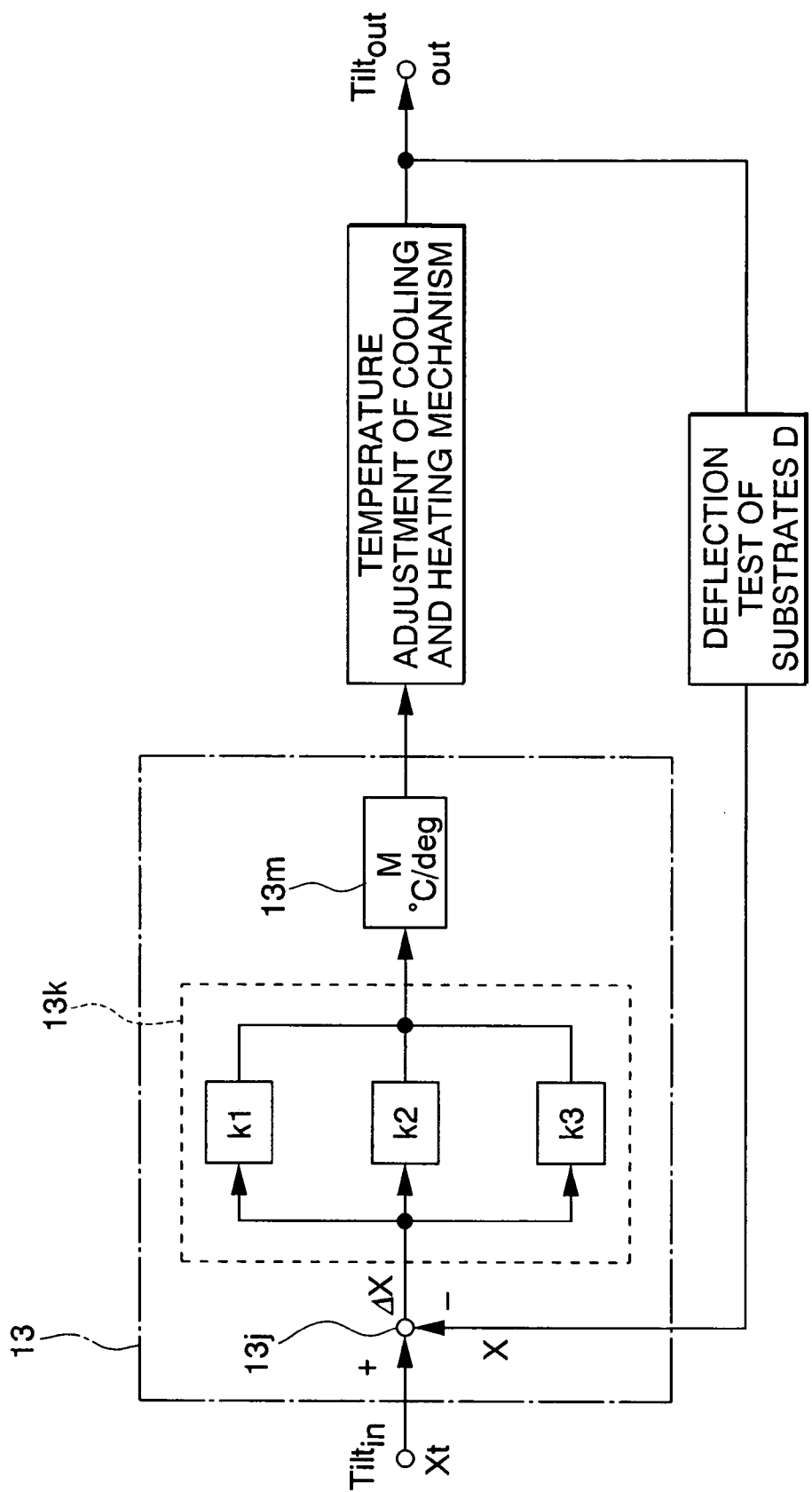
FIG. 6 is a drawing for explaining the temperature control according to an embodiment of the present invention.
Figure 7:
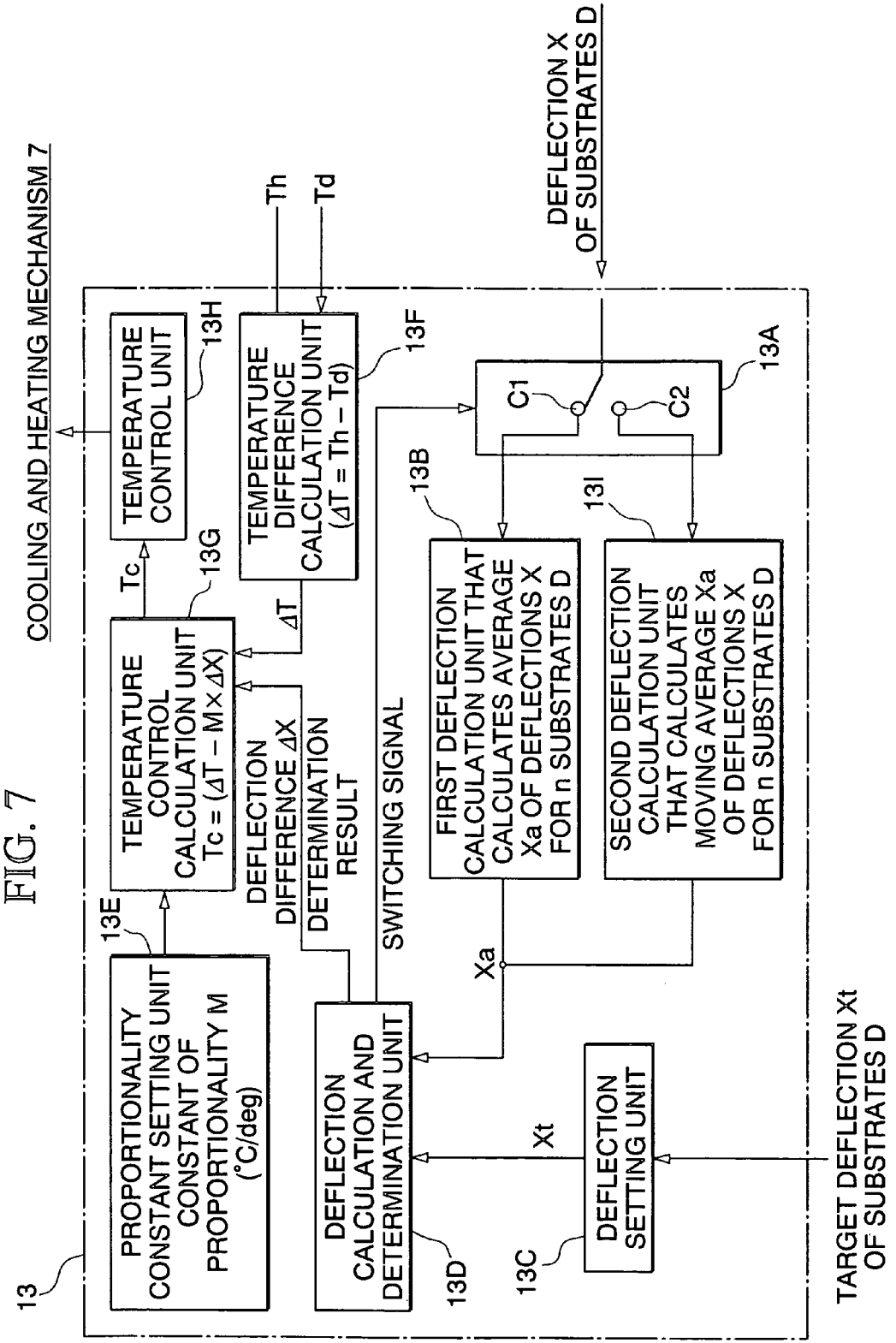
FIG. 7 is a drawing for explaining the temperature control apparatus used in an embodiment of the present invention

The basic embodiment of the processing method and processing apparatus for the substrates according to the present invention will be explained with reference to FIG. 3 to FIG. 7. FIG. 3 is a drawing for explaining the basic conception of the present invention. FIG. 4 is a drawing showing the optical disc bonding device 100 according to an embodiment for explaining the control of the deflection X of the substrates, and FIG. 5 shows a schematic drawing of the mechanism that controls the deflection of the bonded substrates which, in the present embodiment, are substrates consisting of a plurality of individual substrates that have been bonded together. FIG. 6 is a drawing for explaining basic arrangement of a preferable example of the temperature control apparatus that controls the warping of the substrates, and FIG. 7 is a drawing that shows the block structure of the temperature control apparatus that controls the deflection of the substrates.

The basic conception of the present invention will be explained with reference to FIG. 3. Assuming that the deflection of a substrates is X1 when the measured temperature of the mounting table is Th1 and the measured temperature of the substrates is Td1, then Th1−Td1=$\Delta T1$, and as shown in FIG. 3, the point (X1, $\Delta T1$) on the linear function M' is shown by M1.

In order for the deflection X1 of the substrates to be made equal to a desired target deflection Xt, as shown by the dashed line, it is sufficient that the temperature Th2 of the mounting table and the temperature Td2 of the substrates satisfy the temperature difference $\Delta T2$=(Th2−Td2), which corresponds to point M2 on the linear function M' at the target deflection Xt of the substrates. At this time, the difference ($\Delta T1$−$\Delta T2$) between $\Delta T1$ and $\Delta T2$ becomes M (Xt−X1). Expressed as an equation, this becomes ($\Delta T1$−$\Delta T2$)=M(Xt−X1). From this equation, it can finally be deduced that (Th2−Td2)=(Th1−Td1)−M(Xt−X1). (Th1−Td1) denotes the temperature difference $\Delta T1$, which is obtained by subtracting the measured temperature Td1 of the substrates from the measured temperature Th1 of the mounting table, and X1 denotes the deflection of the substrates after curing at that time, and thus each of these are a known numerical value at the point in time that they are measured.

Therefore, it is understood that it is sufficient that either one or both of the temperature Th2 of the mounting table and the temperature Td2 of the substrates are controlled so as to satisfy the principal equation (Th2−Td2)=(Th1−Td1)−M(Xt−X1). When expressed by the temperature Th of the mounting table and the temperature Td of the substrates, this function can be simplified to (Th−Td)=Tc=$\Delta T$−M×($\Delta X$ or $\Delta X'$). Below, this function will serve as the principal function. Here, $\Delta T$ denotes the temperature difference between the temperature Th of a mounting table and the temperature Td of the substrates measured when finding the point M1, and $\Delta X$ denotes the difference between the desired target deflection Xt and the measured deflection X. As described above, $\Delta X'$ is the compensated value obtained by compensating $\Delta X$. This compensation takes into account whether or not the tendency of $\Delta X$, for example, the direction of increase or decrease, increases or decreases as a linear, a second order, or a higher order curve. In embodiment 1, only the temperature of the mounting table is controlled.

As shown in FIG. 4, two individual substrates (not illustrated) are superposed having a photo-curable adhesive layer interposed therebetween, and by eliminating the excess photo-curable adhesive by a spinner apparatus 1, the superposed substrates d having uncured adhesive interposed therebetween are obtained. While the substrates d are being transferred to the turntable 3 from the spinner apparatus 1, the temperature Td of the substrates is measured by a general method in which a substrate temperature measuring device such as an infrared light temperature sensor (not illustrated) is used. The substrates d are mounted on the mounting table 5a among the plurality of mounting tables 5a to 5j, which are disposed in sequence at fixed intervals on the turn table 3. The turntable 3 rotates intermittently in the direction of the arrow (clock) at a constant speed.

The measurement of the temperature Th of each of the mounting tables when located at the position of mounting table 5a is carried out by using a general method, such as an infrared light temperature sensor (not illustrated), or a mounting table temperature measuring device such as a thermocouple (not illustrated). The substrates d are mounted on the mounting table 5a, and the individual substrate among the substrates d that is on the side in contact with the mounting table 5a expands or contracts due to the temperature Th of the mounting table. While the adhesive between the individual substrates is uncured, it is possible to change the shape of the individual substrates on the side in contact with the mounting table 5a comparatively freely. Note that here 5a to 5j are considered to be the mounting tables positioned at mounting position.

At the mounting tables 5a to 5j, a cooling and heating mechanism 7 that serves as the temperature control device of the mounting tables 5 is provided. At the mounting positions 5h, 5i, 5j, 5a, and 5b in the temperature adjustment area 6, adjustment of the temperature of a mounting table is carried out so as to adjust the difference between the temperature of the mounting table and the temperature of the substrates. Next, the temperature adjustment of a mounting table will be explained.

The uncured photo-curable adhesive layer of the substrates d is irradiated by a curing light such as ultraviolet light from a curing light irradiating apparatus 9 and photo-cured to make the bonded substrates D, in which the individual substrates are completely bonded. When the temperature has fallen to room temperature, the necessary tests are carried out on substrates D by a testing apparatus 11. One among the tests is the measurement of the deflection X of the substrate D.

An example of the basic preferable arrangement of the temperature control apparatus 13 will be explained with reference to FIG. 6. The temperature control apparatus 13 calculates the target deflection Xt of the input substrates D and the deflection X of the substrates D found by carrying out the warping tests, and finds the deflection difference $\Delta X$, which is the difference therebetween. This deflection difference $\Delta X$ is compensated by the compensating device 13k. A compensating device 13k that employs a widely used PID control method is explained as a preferable example. This PID control method outputs a compensated value $\Delta X'$. The $\Delta X'$ is a value compensated by a device k1 that carries out proportional control action, in which an output signal is output that is proportional to the deviation between the target value and the measured value; a device k2 that carries out integral control action, in which an output signal is output that is proportional to the time integral of the deviation; and a device k3 that carries out derivative control action, in which an output signal is output that is proportional to the rate of change of the deviation as a function of time, depending on whether the tendency of the deflection difference $\Delta X$ described above is, for example, is a linear function that is a function of time, a second order function that is a function of time, or another function. The calculation of Tc=$\Delta$T−M×$\Delta X'$ described above is carried out by the calculating unit 13m of the temperature control apparatus 13, and temperature adjustment of the cooling and heating mechanism 7 is carried out such that the deflection X of the substrates smoothly and quickly approaches the target deflection Xt.

Note that in the above explanation, the compensation device 13k compensated the deflection difference $\Delta X$ by PID control, but other suitable control methods besides PID control can be used.

A detailed example of the temperature control apparatus 13 will be explained with reference to FIG. 7. The deflection X that has been input into the temperature control apparatus 13 is input into a first deflection calculating unit 13B via a gate C1 of a gate unit 13A, and calculated. The first deflection calculating unit 13B finds the pure average value of the deflection X of a predetermined number of substrates D or the average value of the deflection X within an allowable range (below, these are referred to as the average deflection Xa).

In addition, a desired target deflection Xt is input into the deflection setting unit 13C of the temperature control apparatus 13 as a reference value, and set. This desired target deflection Xt is determined taking into consideration that this deflection in the finished disc is zero or lies within an allowable range. Next, in the deflection calculation and determination unit 13D of the temperature control apparatus 13, a calculation is carried out to find the deflection difference $\Delta X$, which is the difference between the average deflection Xa described above and the desired target deflection Xt described above. Preferably, this deflection difference $\Delta X$ is compensated by the compensation device as described above, but because compensation is not always necessary, the compensation device has been omitted in the temperature compensation device 13 shown in FIG. 7. However, of course during calculation of the temperature Tc, this compensated value $\Delta X'$ can be used instead of the deflection difference $\Delta X$.

In the proportionality constant setting unit 13E of this temperature control apparatus 13, the constant of proportionality M found as described above is registered. It should be possible to select the constant of proportionality M within a range of 15 (° C./deg)$\leq$M$\leq$40 (° C./deg) or should be set to a suitable value within the range of 15 (° C./deg)$\leq$M$\leq$40 (° C./deg), for example, the substantially intermediate values 27 or 28 (° C./deg).

When describing the constant of proportionality M, in the case of a constant of proportionality M within the range 15 (° C./deg)$\leq$M$\leq$40 (° C./deg), the deflection X of the substrates D can be controlled so as to attain a target deflection Xt in a short period of time. However, the constant of proportionality M is a constant that converts the deflection X of the substrates D to a temperature, and when this constant of proportionality M deviates from the optimal value by becoming smaller, the response of the convergence to the target deflection Xt deteriorates. Contrariwise, when the constant of proportionality becomes large, the response of the convergence to this target deflection Xt becomes rapid, but oscillation occurs easily, and convergence takes time. In the present embodiment, in the case that the constant of proportionality M is smaller than 15 (° C./deg), the deflection X of the substrates D slowly approaches the target deflection Xt by using temperature control, and thus a long time is required to reach the target deflection Xt, making this constant of proportionality difficult to use in an actual bonding line. In addition, in the case that the constant of proportionality M is larger than 40 (° C./deg), the deflection X of the substrates D approaches the target deflection Xt in a short time, but the target deflection Xt oscillates vertically off the center, a long time is required to converge on the target deflection Xt, making this constant of proportionality difficult to use in an actual bonding line.

At the same time, in the temperature difference calculation unit 13F of the temperature control apparatus 13, the measured value Th of the mounting table 5a and the measured temperature Td of the substrates d before being mounted on the mounting table are input, the temperature difference calculating unit 13F carries out the calculation of (Th−Td), and the signal for the temperature difference ΔT, which is the result of this calculation, is output. The temperature control calculating unit 13G that finds the temperature Tc, which changes the deflection X so as to attain the target deflection Xt, carries out the calculation of (ΔT−M×ΔX) by the function described above by using the constant of proportionality M from the proportionality constant setting unit 13E, the temperature difference ΔX from the deflection calculation and determination unit 13D, and the temperature difference ΔT from the temperature difference calculating unit 13F, and finds the temperature Tc, which is the difference between the temperature Th of a mounting table and the temperature Td of the substrates d. A temperature command directing whether to raise, lower, or maintain a temperature at a certain ° C. depending on this temperature Tc is sent to the cooling and heating mechanism 7. This temperature command directs how many ° C. to change the temperature command currently provided.

The cooling and heating mechanism 7 provides an electricity-temperature conversion element (not illustrated) such as a Peltier element on the surface of each of the mounting tables under the substrates, and the temperature adjustment can be carried out by using the electrical signal. The temperature adjustment of a mounting table 5 shown in FIG. 5 is carried out according to the temperature control amount Tc described above in the temperature adjustment area 6, which includes the mounting positions 5h, 5i, 5j, 5a, and 5b, as shown in FIG. 4. The reason that five mounting tables are present in the temperature adjustment area 6 is due to taking into consideration the speed of the temperature change of a mounting table 5 and the time required for a mounting table 5 to transit the temperature adjustment area 6. In the case that the time-lag of the temperature adjustment of a mounting table 5 is a minor problem, one or two mounting tables may be present in the temperature adjustment area 6.

By adjusting the temperature of a mounting table in this manner, the control of the temperature difference ΔT between the temperature Th of a mounting table 5 and the temperature Td of the substrates d is carried out and thereby the deflection of the substrates D is controlled. The relationship between the warping of the substrates D and the temperature is that when the temperature of the substrates d rises, the warping of the substrates D becomes concave, and when the temperature of the substrates d falls, the warping of the substrates D becomes convex. That is, when the temperature of the substrates d changes, the deflection and direction change.

The operation will be explained with reference again to FIG. 4. A temperature adjustment area 10 is provided downstream of the curing light irradiating apparatus 9 for making the temperature of the substrates D equal to room temperature. This temperature adjustment area 10 is also provided in other generally used bonding apparatuses for individual substrates, and will not be explained in detail. However, in a cooling and heating mechanism that uses an electricity-heat conversion element or the like, the cooling time per unit temperature requires about 2.5 more time than the heating time, and thus the method of cooling adjusts the temperature difference ΔT so as to attain a predetermined value in a short period of time such that the temperature of the substrates D in this temperature adjustment area 10 attains room temperature or a temperature that is somewhat lower than the control temperature of the cooling and heating mechanism 7 at that time.

The substrates D are discharged before being conveyed to the temperature adjustment area 10 or discharged at the mounting position as shown in the figure and naturally cooled at a cooling position (not illustrated). While the temperature has fallen to room temperature, the substrates D are tested by the testing apparatus 11. The data for the deflection X found by the testing apparatus 11 is sent to the temperature control apparatus 13, as described above, and an operation such as that described above is repeated. The term "room temperature" denotes the ambient temperature of the substrates D, and indicates the temperature of the room when the substrates D are in the atmosphere of a room or indicates the temperature of the atmosphere when the substrates D are surrounded by the atmosphere in an apparatus.

According to embodiment 1, the deflection of the bonded substrates D after adhesive curing can attain a desired value by controlling the temperature of a mounting table 5 as described above, adjusting the difference between the temperature of a mounting table 5 and the temperature of the substrates d, and controlling the deflection of the superposed substrates d by this adjusted temperature difference.

Embodiment 2

Figure 8:
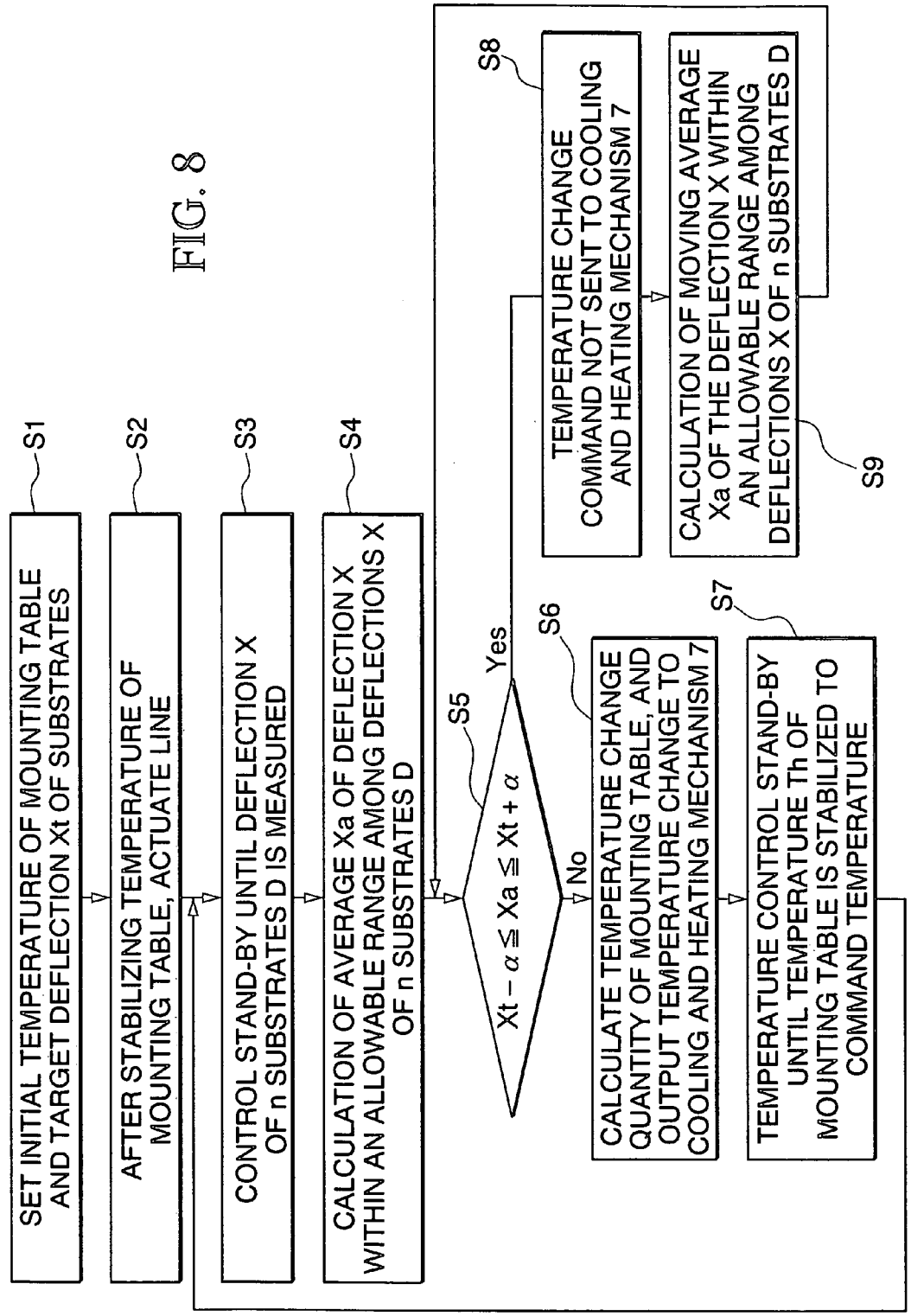
FIG. 8 is a drawing showing a flowchart of the operation of an embodiment of the present invention.
Figure 9:
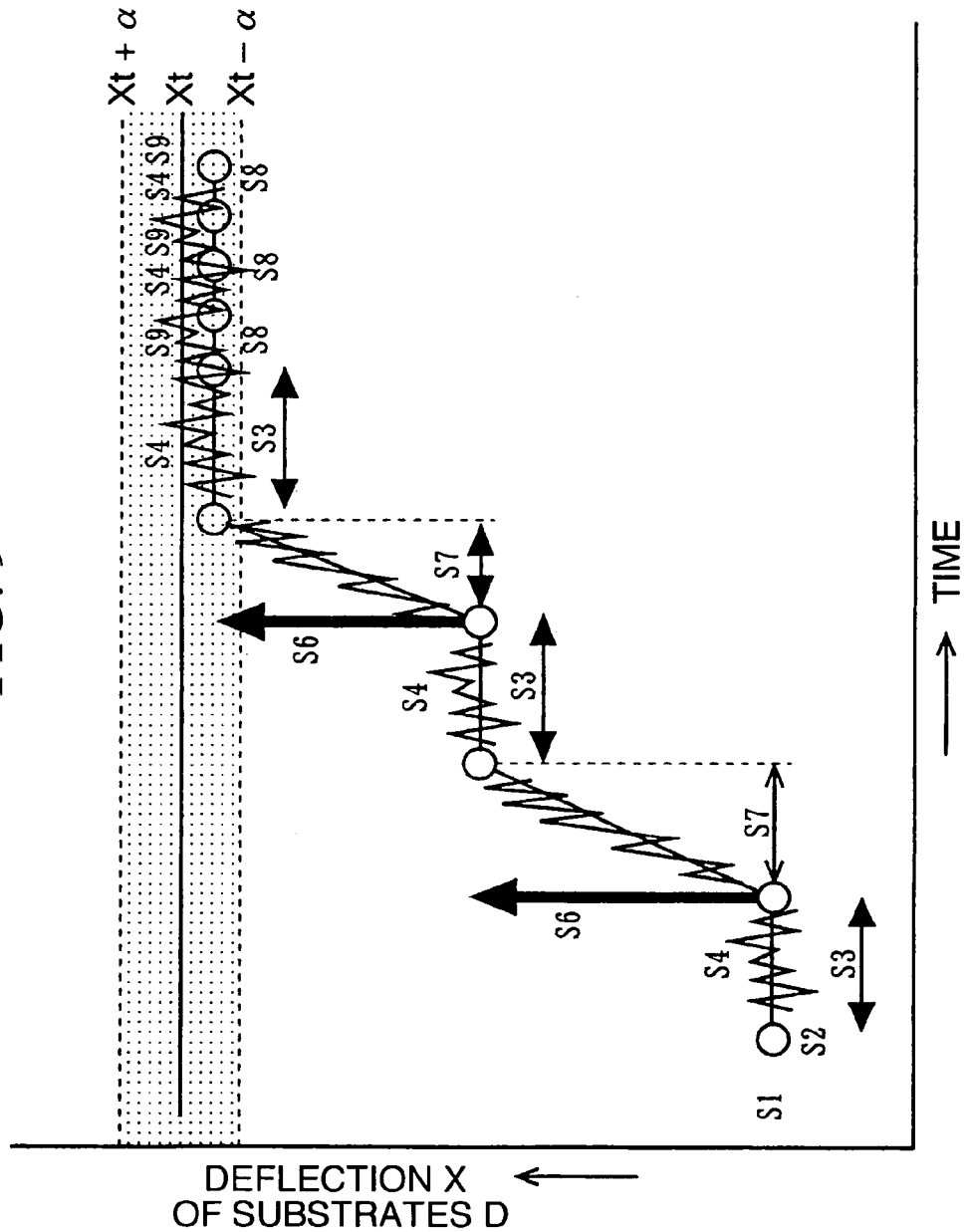
FIG. 9 is a drawing showing the relationship between the flowchart in FIG. 7 and (deflection X of the substrates—time).
Figure 10:
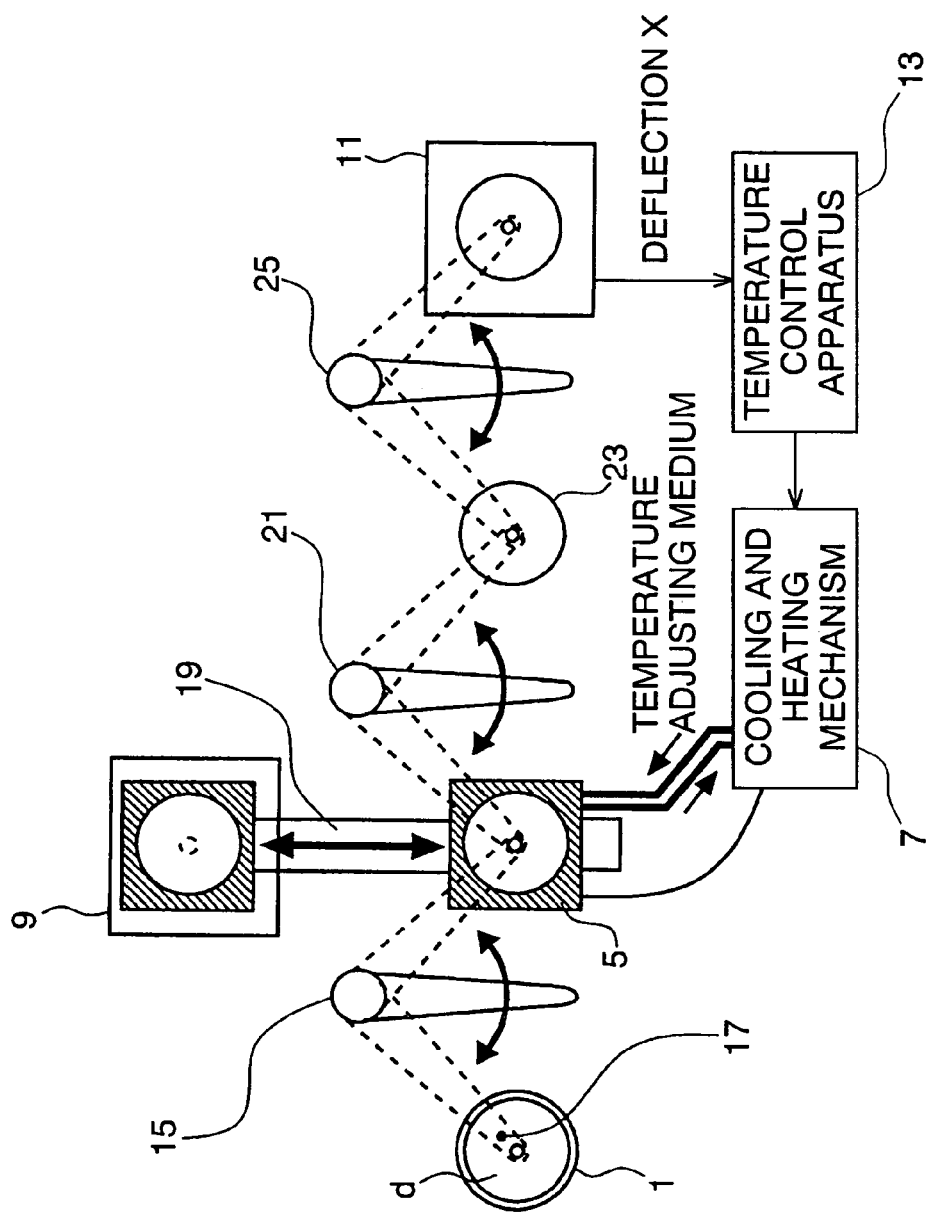
FIG. 10 is a drawing showing the bonding line 200 of the optical disc substrates that is another embodiment of the present invention.
Figure 11A:
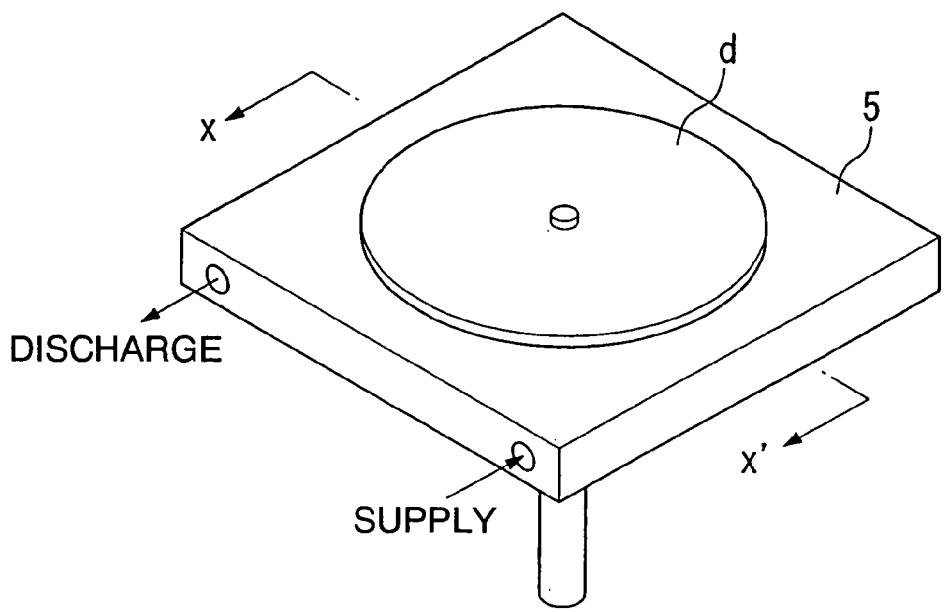
FIG. 11A and FIG. 11B are drawings showing an example of the mounting table used in the present invention.
Figure 11B:
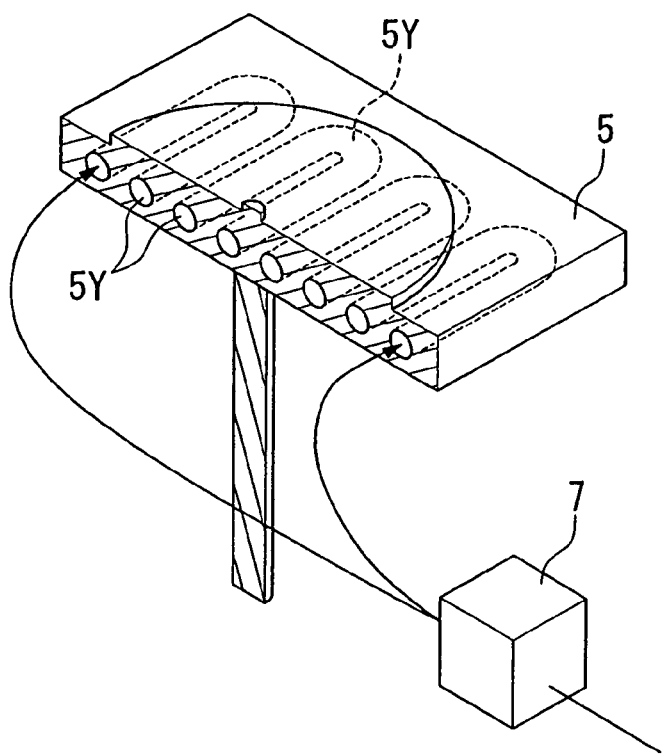

A second embodiment will be explained with reference to FIG. 5 to FIG. 11B. FIG. 5, FIG. 6 and FIG. 7 have been described above, and their explanation will be omitted. FIG. 8 is a drawing showing a flowchart for explaining the control of the deflection X of substrates. FIG. 9 is a drawing showing the relationship between the change in warping of the substrates and time. FIG. 10 is a drawing sowing the optical disc bonding apparatus 200 according to another embodiment of the present invention. FIGS. 11A and 11B show an example of the mounting table which can be used in the optical disc bonding apparatus shown in FIGS. 4 and 10. The steps S1 to S9 described below correspond to steps S1 to S9 in the flowchart in FIG. 8.

In activating the bonding line for the substrates, first in step S1 the target deflection Xt, which is the warping target value for the substrates D, is input into the temperature control apparatus 13, and set in the deflection setting unit 13C. At the same time, the initial temperature of a mounting table 5 is set in the temperature control unit 13H. Past values close to room temperature, for example, are used as this initial temperature.

In step S2, the cooling and heating mechanism 7 is controlled so as to maintain this initial temperature, and then the temperature of a mounting table 5 has stabilized at the initial temperature, the bonding line for the substrates is activated as shown in FIG. 10. This stand-by time is, for example, about 10 to 30 seconds. After passage of the stand-by time, as described in embodiment 1, the substrates d superposed at the spinner apparatus 1 are held by suction to a single transfer arm 15 that carries out a left to right turning operation, and then they are conveyed from the spinner apparatus 1 to a mounting table 5. In the case that it is necessary to measure the temperature Td of the substrates d, the temperature Td of the substrates d is measured during the conveyance of the substrates d by a substrate temperature measuring device 17 such as an infrared temperature sensor provided on the transfer arm 15.

A mounting table 5 has the structure shown, for example, in FIG. 11A and FIG. 11B. A duct or passage 5Y zigzags through the interior of a mounting table 5, and substantially uniformly cools or heats a mounting table 5. A temperature adjusting medium, such as air or water, that adjusts the temperature flows through the duct 5Y due to a temperature adjusting unit (not illustrated) in the cooling and heating mechanism 7. Although not illustrated, a mounting table temperature measuring device such as an infrared sensor or thermocouple is provided on the bottom surface side of a mounting table 5 to measure the temperature thereof.

The substrates d mounted on a mounting table 5 are conveyed up to the curing light irradiation apparatus 9 by a conveyance mechanism 19, such as a 1-axis robot, along with the mounting table 5. The adhesive between the individual substrates in the pair of substrates d is cured by irradiation of a curing light such as ultraviolet light, and the substrates d become bonded substrates D. The substrates D are returned to the position shown in the figure along with the mounting table 5 by the conveyance mechanism 19. At the position shown in the drawing, the substrates D are conveyed to a static eliminating mechanism 23 by a second transfer arm 21. The static eliminating mechanism 23 blows air having positive or negative ions onto the substrates D, the static electricity on the substrates D is neutralized, and at the same time, cooling is carried out. Subsequently, the substrates D are conveyed to the testing apparatus 11 by the third transfer arm 25.

In step S3, number n of substrates D is tested by the testing apparatus 11, and in sequence, the results are input into the first deflection calculation unit 13B after passing through the gate C1 of the gate unit 13A shown in FIG. 7. Temperature control is carried out at the initial temperature described above until the deflection X of the n substrates D has been measured. When the initial temperature is set in the temperature control unit 13H, a signal (not illustrated) is sent to the deflection calculation and determination unit 13D, this deflection calculation and determination unit 13D receives this signal, and closes the gate C1 of the gate unit 13A. At this time, the gate C2 is opened. That is, gates C1 and C2 operate at opposite phases.

In step S4, the first deflection calculation unit 13B finds the average deflection Xa of the deflection X of the n substrates D sent through the gate C1. This average deflection Xa is the average value of the deflection X within a predetermined allowable range, and a deflection X that falls outside this range is ignored.

In step S5, the average deflection Xa of the deflection X of the n substrates D is sent to the deflection calculation and determination unit 13D, and the deflection calculation and determination unit 13D determines whether or not the average deflection Xa falls within the target range of the target deflection Xt±α. α is selected from among values equal to or less than 0.1°, and preferably equal to or less then 0.05°.

In step S6, if the average deflection Xa does not fall within the target range of the target deflection Xt±α, then the deflection calculation and determination unit 13D sends the deflection difference ΔX, which is the difference between the average deflection Xa and the target deflection Xt, to the temperature control amount calculation unit 13G, and the temperature control amount calculation unit 13G carries out the calculation according to the function described above (ΔT–M×ΔX or the compensated value ΔX' thereof) from the deflection difference ΔX (or the compensated value ΔX' thereof), the constant of proportionality M (° C./deg) set by the proportionality constant setting device 13E, the measured temperature Th of the input mounting table, and the measured temperature Td of the substrates d, calculates the temperature Tc, and sends a signal corresponding to the temperature Tc to the temperature control unit 13H.

The temperature Tc indicates the current temperature control amount, in this case, how much the initial temperature described above is changed. The temperature control unit 13H controls the cooling and heating mechanism 7 using a command temperature that combines the initial temperature that has been set and the temperature Tc. When the temperature Tc is positive, the set initial temperature is increased, and when the temperature Tc is negative, the set initial temperature is decreased.

In step S7, a mounting table 5 is controlled so as to attain this command temperature until the temperature of the mounting table 5 stabilizes at this command temperature, without changing the control. When stabilized at the command temperature, the control operation described above is again carried out.

If the newly found average deflection Xa does not fall within the target range of the target deflection Xt±α, the temperature control calculating unit 13G again carries out the calculation according to the equation described above (ΔT–M×ΔX or the compensated value ΔX' thereof) from the deflection difference ΔX, which is the difference between the newly found average deflection Xa and the target deflection Xt, the constant of proportionality M set by the proportionality constant setting unit 13E, the measured temperature Th of the input mounting table 5, and the measured temperature Td of the substrates d, calculates the temperature Tc, and controls the cooling and heating mechanism 7 using the new command temperature, which is a combination of the command temperature described above and the temperature Tc. This control is maintained, and when the mounting table stabilizes at this new command temperature, control operation is again carried out as described above, and a new average deflection Xa is calculated again.

In step S8, if the newly calculated average deflection Xa falls within a target range (Xt–α≦Xa≦Xt+α) of the target deflection Xt±α, the deflection calculation and determination unit 13D does not output a signal to the temperature control amount calculating unit 13G. Therefore, because the temperature control amount calculation unit 13G does not send the temperature Tc to the temperature control unit 13H, the temperature control amount calculation unit 13G maintains the new command temperature, and as long as the new average deflection Xa falls within the target range of the target deflection Xt±α, the cooling and heating mechanism 7 is controlled using the new command temperature.

In step S9, in addition, when Xt–α≦Xa≦Xt+α, the deflection calculation and determination unit 13D switches from gate C1 in the gate unit 13A to gate C2, closes gate C2, and the second deflection calculation unit 131 finds the moving average value Xa by calculating the deflection X of the n substrates sent through gate C2. Here, the moving average value denotes the average value Xa of the deflection X, which is in a predetermined allowable range, among the deflections of the most recent n substrates after curing.

While the average value Xa of this deflection X is Xt−α≦Xa≦Xt+α, the command temperature is not changed, and the previous command temperature is maintained.

However, when the calculation and determination unit 13D determines that the most recent moving average deflection Xa does not fall within the target range of the target deflection Xt±α, the processing returns to the operation of steps S6→S7→S3 in the flowchart shown in FIG. 8, and then the operations of steps S4, S5 and after are carried out.

In this manner, the temperature control of a mounting table 5 is carried out, and the difference between the temperature Th of a mounting table 5 and the temperature Td of the substrates d, that is, the temperature control amount Tc, is found, the temperature of only a mounting table 5 is controlled, and the temperature difference Tc between a mounting table 5 and the substrates d is made equal to Tc. Thereby, the deflection of the superposed substrates d is controlled, and it is possible to make the deflection of the bonded substrates D after curing of the adhesive equal to a desired value.

FIG. 9 shows the state in which the deflection X of the substrates d falls within the target range of the target deflection Xt±α as a function of time, and approaches the set value Xt. S1 to S9 in the figure correspond to steps S1 to S9 in the flowchart shown in FIG. 8. Steps S3 and S7 in the figure shows the stand-by time, and the arrows at step S6 show that the deflection (tilt angle) X has largely changed in the direction of the target deflection Xt.

Embodiment 3

In an actual bonding line for individual substrates, the individual substrates are conveyed to the bonding environment, the bonding requires a predetermined amount of time or greater, and the temperature of the bonding environment is maintained substantially constant (for example, 25° C.). Thus, frequently the temperature of the substrates d that are superposed with the adhesive interposed therebetween can be considered to be constant.

Therefore, in this case, in the principal equation (Th2−Td2)=(Th1−Td1)−M(Xt−X1), the temperature of the substrates d is considered to be Td2=Td1, and thus the equation can be rewritten as Th2=Th1−M(Xt−X1)=Th1−M·ΔX. From this equation, simply by subtracting M·ΔX from the temperature Th1 of a mounting table when finding the constant of proportionality M, it is possible to find the temperature Th2 of a mounting table. In addition, by using a compensated value ΔX', which is the deflection difference ΔX that has been compensated as described above, it is possible to find the temperature Th2 of a mounting table simply by subtracting M·ΔX' from the temperature Th1 of a mounting table.

As described above, the present inventors confirmed that a constant of proportionality M is preferably a numerical value within a range from 15 (° C./deg) to 40 (° C./deg), and if a constant of proportionality M having a numerical value within this range is used, then the temperature Th1 of the mounting table is known when finding the constant of proportionality M. Thus, in the actual bonding line, both the temperature measurement of a mounting table and a temperature measurement of the substrates becomes unnecessary, and simply by measuring the deflection X of the substrates D and carrying out the calculation according to the above equation, the temperature of a mounting table can be controlled so as to attain any temperature.

In this embodiment, for example, the cooling capacity of the cooling and heating mechanism 7 is 2 sec/° C., the constant of proportionality M is 28.5° C./deg, and the measured value X of the substrates D is 0.2 deg smaller than the setting value Xt. In this case, from the equation Th2=Th1−M(Xt−X1), Th2=Th1−5.7° C. Therefore, it is understood that Th2 should be about 6° C. lower than the temperature Th1 found when calculating the constant of proportionality M. For example, if Th1 is 26° C., then Th2 should be about 20° C. Because the cooling capacity of the cooling and heating mechanism 7 shown in FIG. 4 and FIG. 10 is 2 sec/° C., the time at this point is about 12 seconds, the temperature of a mounting table will be substantially stabilized after the passage of about 12 seconds, and thus the bonding line can be operated. In this case, the stand-by time is approximately 12 seconds.

In addition, conventionally, when curing the adhesive in the curing light irradiation system, there has been the problem that the temperature of a mounting table increases due to the curing heat generated while the adhesive layer is being cured. However, in the case that the embodiment 3 is realized by the apparatus shown in FIG. 10, FIG. 11A, and FIG. 11B, temperature control of a mounting table is carried out even during the irradiation by the curing light. Thus, there are the effects that it is possible to limit increases in the temperature of a mounting table, make the temperature fluctuation of a mounting table small, and at the same time, make temperature increases in the substrates small.

In the above explanation, the case that the temperature of the substrates d was considered to be Td2=Td1, but there are also cases in which the temperature Th of the mounting table can also be considered to be Th2=Th1. In this case, in the principal equation described above, (Th2−Td2)=(Th1−Td1)−M(Xt−X1), the temperature of a mounting table can be considered to be Th2=Th1, and thus this equation can be rewritten as Td2=Td1+M(Xt−X1)=Td1+M·ΔX. From this equation, simply by adding M·ΔX to the temperature Td1 of the substrates when finding the constant of proportionality M, the temperature Td2 of the substrates can be found. In addition, when the compensated value ΔX', which is the compensated deflection difference ΔX as described above, simply by adding M·ΔX' to the temperature Td1 of the substrates, it is possible to find a more preferable temperature Td2 for the substrates.

Embodiment 4

In the embodiment described above, a configuration was described in which the constant of proportionality M was appropriately selected from constants of proportionality in a range from 15 (° C./deg) to 40 (° C./deg), that is 15 (° C./deg)≦M≦40 (° C./deg). However, as described in Embodiment 1 and Embodiment 2, there cases in which, in an actual production line (not illustrated), the temperature sensor that measures the temperature Th of a mounting table and a temperature sensor that measures the temperature Td of the substrates are provided and the measured temperature data thereof is obtained. Thus, a calculating device that calculates the constant of proportionality M is provided in the processing apparatus of the substrates, and a constant of proportionality M suitable for the processing conditions at this time can be found.

In this embodiment, the temperature difference ΔT between the temperature Td of the substrates and the temperature of Th of a mounting table is found, and at the same time, the deflection X of the substrates D after irradiation by curing light is measured. The constant of proportionality M is found from the slope of the straight line found from a combination (X, ΔT) of at least two points of the temperature difference ΔT and the deflection X, a combination (X, ΔT) of each of the substrates is added as available, and the constant of proportionality M is updated. For example, if the straight line (a straight line identical to the straight line represented by the linear function M' described above) as described above is found from twenty combinations (X, ΔT) of the temperature difference ΔT and the deflection X and the constant of proportionality M is found from the slope of this line, when the twenty-fifth temperature difference ΔT and deflection X are found, the constant of proportionality M is found from the twenty points of the sixth through twenty-fifth temperature difference ΔT and deflection X. When the twenty-sixth temperature difference ΔT and deflection X are found, the constant of proportionality M is found from the twenty points between the seventh and the twenty-sixth temperature difference ΔT and deflection T.

In this manner, while finding the constant of proportionality M by taking into account the combinations (X, ΔT) of the temperature difference ΔT and the deflection X for each of the substrates, the temperature Tc is found by carrying out the calculation of (ΔT−M×ΔX or the compensated value ΔX' thereof) by using the found constant of proportionality M, as explained in embodiments 1 and 2 or embodiment 3. Thus, one or both of the temperature Th of a mounting table and the temperature Td of the substrates can be controlled such that Tc=Th−Td.

According to the present invention, the appropriate control temperature is found while finding sequentially the constant of proportionality M by the measured temperature data for each of the mounting tables and each of the substrates and the measured deflection data for each of the substrates. Thus, depending on the conditions at the time, it is possible to automatically select a suitable constant of proportionality M from a range of 15 (° C./deg)≦M≦40 (° C./deg).

Embodiment 5

In embodiment 4, the constant of proportionality M (° C./deg) is updated for each of the mounting tables and each of the substrates, but in this embodiment, the measured temperature of a predetermined number (for example, 10) substrates is extracted each time the number of the processed substrates reaches a predetermined number, for example, 500 or 1000, and thereby the average temperature Td1 thereof is found. Similarly, the measured temperature of the substrates for the next predetermined number (for example, 10) is extracted, and the average temperature Td2 thereof is found. At the same time, the measured temperature of a mounting table on which the predetermined number of substrates has been mounted is extracted, and the average temperature Th1 thereof is found. Similarly, the measured temperature of the mounting tables on which the next predetermined number of substrates has been mounted is extracted, and the average temperature Th2 thereof is found.

In addition, for the deflection of the substrates, the deflection data for a predetermined number of substrates after curing, which are the object for extraction of the measured temperature, is extracted, the pure average thereof or the average of the deflections within an allowable range is found, and the result serves as the deflection X of the substrates. As described above, the deflection difference ΔX that expresses the difference between the deflection X and the target deflection Xt, is found. Or, as described above, the compensated value ΔX', which is the compensated value of the deflection difference ΔX, is found.

As explained in embodiment 4, the constant of proportionality M at the time can be found from the principal equation described above. In this embodiment, the constant of proportionality M is found for each of the predetermined number of substrates, and until the constant of proportionality M for the next predetermined number is found, this found constant of proportionality M is used in order to carry out and temperature control of either or both of each of the mounting tables or each of the substrates. Thus, like embodiment 4, it is possible to select automatically the constant of proportionality suitable for the various conditions at the time from a range of 15 (° C./deg)≦M≦40 (° C./deg).

In embodiment 4 and embodiment 5, like embodiment 3, the temperature of the substrates is substantially room temperature, and if the room temperature is constant, the temperature of the substrates is also constant. Thus, it is possible to measure only the temperature of the mounting table to carry out control the temperature of a mounting table according to temperature Tc. There is not need to measure the temperature of the substrates. Thereby, the control can be simplified.

Embodiment 6

In the above embodiments, control is carried out by using the constant of proportionality M (° C./deg), finding the temperature Tc, which controls the warping of the substrates D according to Tc=ΔT−M×(ΔX or ΔX'), so as to approach and match the target deflection Xt, and finding the moderating temperature difference for the temperature difference between the present temperature of the a mounting table and the temperature of the substrates. However, control can be carried out by finding the temperature difference using the linear function M' shown in FIG. 2 and FIG. 3.

In this case, as is clear from FIG. 2 and FIG. 3, the linear function M' has a slope of M when Th−Td is ΔT, and thus can be expressed by the equation ΔT=MX+a. The constant value a is the value of ΔT (ordinate) when the deflection X (abscissa) of the substrates is zero, and is determined by the combination of the warping of two bonded individual substrates, such as the deflection X of individual substrates to be bonded and the direction of warping or the like.

By inputting beforehand the linear function M' (ΔT=MX+a) into a personal computer, microcontroller, or the like, or by inputting a plurality of linear functions having predetermined constant values a1, a2, a3, . . . , an that correspond to a variety of conditions, it is possible to select either depending on the conditions. By inputting the target setting value Xt into this linear function, it is possible to control one or both of a mounting table or the substrates so that the sought temperature difference ΔT between a mounting table and the substrates can be found automatically and the temperature difference between the mounting table and the substrates becomes ΔT.

In this embodiment, it is always possible to carry out control by using an optimal linear function M' even if the deflection of the substrates fluctuates due to the occurrence of variation in the deflection of individual substrates caused by variation in moulding and sputter technologies, fluctuations in the ambient temperature or the like. For example, when control is carried out using ΔT1=M×Xt+a1, . . . (1) based on the linear function M' in order to make the deflection of the substrates equal to a target deflection Xt and the deflection X is controlled so as to attain the target deflection Xt and be constant, in the case that the deflection X deviates from the set range due to some cause (the segment a changes but the slope of the linear function M' does not), the following operation is carried out by a deflection determining device (not illustrated) outputting a signal.

First, the current deflection X of the measured substrates is substituted into the linear function M', and the temperature difference $\Delta T2\{=M \times X+a2, \ldots, (2)\}$ between the present temperature of a mounting table and the temperature of the substrates is calculated. Because the difference between the temperature of a mounting table and the temperature of the substrates is controlled so as to be constant, $\Delta T1=\Delta T2$, and from equation (1) and equation (2), $a2=M(Xt-X)+a1$ is obtained. Therefore, by carrying out control by updating the segment a1 of equation (1) to a2, it is possible to adjust the deflection X.

In the embodiment described above, only the temperature of a mounting table is controlled, but by controlling only the temperature of the substrate or controlling the temperatures of both the mounting table and the substrates, it is possible to realize the present invention, and it is possible to make the deflection of the substrates equal to the warping value equal to the target deflection Xt. Of course, the deflection can be made equal to zero.

In addition, the embodiment described above was explained in which the substrate was an substrate, but the present invention can be similarly implemented for other substrates that are bonded having an adhesive interposed therebetween, such as a glass sheet, a synthetic resin sheet, or the like.

The effect of the present invention according to each of the aspects is as follows:

1. According to the invention in aspect 1, it is possible to obtain automatically a substrate consisting of bonded individual substrates having a desired deflection (tilt angle).
2. According to the invention in aspect 2, it is possible to obtain automatically a substrate consisting of bonded individual substrates having a desired deflection (tilt angle) more smoothly and in a shorter period of time by using a compensated value $\Delta X'$ for the deflection X of the substrates.
3. According to the invention in aspect 3, it is possible to obtain simply and automatically a substrate consisting of bonded individual substrates presenting a desired deflection (tilt angle) without measuring the temperature of the substrates.
4. According to the invention in aspect 4, it is possible to obtain automatically a substrate consisting of bonded individual substrates presenting a desired deflection (tilt angle) more smoothly and in a shorter period of time without measuring the temperature of the substrates by using a compensated value $\Delta X'$ for the deflection X of the substrates and making the temperature of the substrates substantially constant.
5. According to the invention in aspect 5, it is possible to obtain simply and automatically a substrate consisting of bonded individual substrates presenting a desired deflection (tilt angle) by making the temperature of a mounting table substantially constant without measuring the temperature of a mounting table.
6. According to the invention in aspect 6, it is possible to obtain automatically a substrate consisting of bonded individual substrates presenting a desired deflection (tilt angle) more smoothly and in a shorter period of time by using a compensated value $\Delta X'$ for the deflection X of the substrates and making the temperature of the substrates substantially constant.
7. According to the invention in aspect 7, it is possible to obtain simply and automatically a substrate consisting of bonded individual substrates presenting a desired deflection (tilt angle) in an actual bonding step by finding a constant of proportionality M ($°$ C./deg), which is the basic insight of the present invention.
8. According to the invention in aspect 8, it is possible to obtain simply and automatically a substrate consisting of bonded individual substrates presenting a desired deflection (tilt angle) while obtaining a constant of proportionality M that suits the conditions during bonding, without finding a constant of proportionality M ($°$ C./deg), which is the basic insight of the present invention.
9. According to the invention in aspect 9, it is possible to specify a preferable range for the constant of proportionality M and select and use the constant of proportionality M.
10. According to the invention in aspect 10, a more preferable warping adjustment of the substrates becomes possible because it is possible to compensate the deflection X of the substrates by using PID control.
11. According to the invention in aspect 11, it is possible do decrease the influence of variation in the warping and carry out stable temperature control because the average deflection of n substrates after curing is found, the temperature is calculated using the average deflection, and temperature control of a mounting table is carried out by using this temperature Tc.
12. According to the invention in aspect 12, it is possible to decrease further the influence of variation in the warping and carry out stable temperature control because the amount of the noise is decreased.
13. According to the invention in aspect 13, it is possible to maintain the temperature of a mounting table within a set range easily.
14. According to the invention in aspect 14, it is possible to carry out temperature control of a mounting table stably by using the averages of new deflection data.
15. According to the invention in aspect 15, it is possible to return to a set range in a short time period without hunting in the case that the average deflection Xa of the substrates falls outside the set range.
16. According to the invention in aspect 16, it is possible to find the temperature difference $\Delta T$ between a mounting table and the substrates simply by substituting the target deflection Xt into a predetermined linear function and carry out temperature control simply.
17. According to the invention in aspect 17, it is possible to present a processing apparatus for substrates that can automatically obtain bonded substrates having a desired deflection (tilt angle).
18. According to the invention in aspect 18, it is possible to present an automatic processing apparatus for substrates that can obtain in a shorter period of time and more smoothly bonded substrates having a desired deflection (tilt angle).
19. According to the invention in aspect 19, it is possible to obtain simply and automatically a substrate consisting of bonded individual substrates that present a desired deflection (tilt angle) without measuring the temperature of the substrates.
20. According to the invention in aspect 20, it is possible to obtain automatically a substrate consisting of individual bonded substrates presenting a desired deflection (tilt angle) without measuring the temperature of the substrates by using the compensated value $\Delta X'$ of the deflection X of the substrates and making the temperature of the substrates substantially constant.
21. According to the invention in aspect 21, it is possible to obtain simply and automatically substrates consisting of bonded individual substrates presenting a desired deflection (tilt angle) by making the temperature of a mounting table constant, without measuring the temperature of the mounting table.

22. According to the invention in aspect 22, it is possible to obtain simply and automatically substrates consisting of bonded individual substrates presenting a desired deflection (tilt angle) by using the compensated value ΔX' of the deflection X of the substrates and making the temperature of the mounting table substantially constant.

23. According to the invention in aspect 23, it is possible to obtain simply and automatically a substrate consisting of bonded individual substrates having a desired deflection (tilt angle) in an actual bonding step by finding a constant of proportionality M (° C./deg), which is the basic insight of the present invention.

24. According to the invention in aspect 24, it is possible to obtain automatically a substrate consisting of bonded individual substrates having a desired deflection (tilt angle) while obtaining a constant of proportionality M suitable to the conditions during bonding without finding a constant of proportionality M (° C./deg), which is the basic insight of the present invention.

25. According to the invention in aspect 25, it is possible to specify a preferable range for the constant of proportionality M, select and use this constant of proportionality M, and thereby simplify the apparatus.

26. According to the invention in aspect 26, it is possible to present an apparatus in which a more preferable warping adjustment of the substrates is possible because the deflection X of the substrates can be compensated by using PID control.

27. According to the invention in aspect 27, it is possible do decrease the influence of variation in the warping and carry out stable temperature control because the average deflection of n substrates after curing is found, the temperature is calculated using the average deflection, and temperature control of a mounting table is carried out by using this temperature Tc.

28. According to the invention in aspect 28, it is possible to decrease further the influence of variation in the warping and carry out stable temperature control.

29. According to the invention in aspect 29, it is possible to maintain the temperature of a mounting table within a set range easily.

30. According to the invention in aspect 30, it is possible to carry out temperature control of a mounting table stably by using the newest average of the deflection data.

31. According to the invention in aspect 31, it is possible to return to a set range in a short time period without hunting in the case that the average deflection Xa of the substrates falls outside the set range.

32. According to the invention in aspect 32, it is possible to find the temperature difference ΔT between a mounting table and the substrates simply by substituting the target deflection Xt into a predetermined linear function and carry out temperature control simply.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A processing method for substrates, comprising:
   a step in which substrates before curing are mounted on a mounting table, said substrates having a plurality of individual substrates and an uncured photo-curable adhesive layer interposed between these individual substrates;
   a step in which substrates after curing are obtained wherein, while said substrates before curing are mounted on said mounting table, said individual substrates are bonded together by photo-curing said adhesive layer by irradiating said substrates before curing with photo-curing light; and
   a step in which a deflection X of said substrates after curing is controlled by controlling at least one of said substrates before curing and said mounting table;
   the step in which said deflection X is controlled comprises:
   a step in which a temperature difference ΔT between a temperature Th of said mounting table and a temperature Td of said substrates before curing is found;
   a step in which a deflection difference ΔX between the deflection X of said substrates after curing and a target deflection setting value Xt is found;
   a step in which a temperature Tc is found by Tc=ΔT−M×ΔX by using a constant of proportionality M determined by a correlation between said temperature difference ΔT and said deflection X; and
   a step in which at least one of said substrates before curing and said mounting table are temperature controlled according to said temperature Tc such that Tc=Th−Td.

2. A processing method for substrates according to claim 1, further comprising a step in which a compensated value ΔX', which is said deflection difference ΔX that has been compensated according to conditions that include the tendency of said deflection difference ΔX, is found, and where this compensated value ΔX' serves as the value of said deflection difference ΔX, said temperature Tc is found.

3. A processing method for substrates according to claim 1, wherein:
   said constant of proportionality M (° C./deg) is a constant of proportionality expressing the slope of a straight line found from a plurality of combinations (X, ΔT) of the temperature difference ΔT between the temperature Th of said mounting table and the temperature Td of said substrates before curing and the deflection X of the substrates after curing by irradiation of a curing light, and is found in advance.

4. A processing method for substrates according to claim 1, wherein:
   said constant of proportionality M (° C./deg) is a constant of proportionality expressing the slope of a straight line found from a plurality of combinations (X, ΔT) of the temperature difference ΔT between the temperature Th of said mounting table and the temperature Td of said substrates before curing and the deflection X of the substrates after curing by irradiation of a curing light, and a warping of said substrates is adjusted while finding said constant of proportionality M by updating said combination (X, ΔT) as necessary.

5. A processing method for substrates, comprising:
   a step in which substrates before curing are mounted on a mounting table, said substrates having a plurality of individual substrates and an uncured photo-curable adhesive layer interposed between these individual substrates;

a step in which substrates after curing are obtained wherein, while said substrates before curing are mounted on said mounting table, said individual substrates are bonded together by photo-curing said adhesive layer by irradiating said substrates before curing with photo-curing light; and a step in which a deflection X of said substrates after curing is controlled by controlling at least one of said substrates before curing and said mounting table;

the step in which said deflection X is controlled comprises:

a step in which a temperature Th of said mounting table is found;

a step in which a deflection difference $\Delta X$ between a target deflection setting value Xt and said deflection X is found;

a step in which a temperature Tc is found by carrying out a calculation of Tc= Th$-$M$\times\Delta X$ by using a constant of proportionality M determined by a correlation between said temperature Th of said mounting table and said deflection X; and a step in which a temperature control of said mounting table is carried out according to said temperature Tc.

6. A processing method for substrates according to claim 5, further comprising a step in which a compensated value $\Delta X'$, which is said deflection difference $\Delta X$ that has been compensated according to conditions that include the tendency of said deflection difference $\Delta X$, is found, and where this compensated value $\Delta X'$ serves as the value of said deflection difference $\Delta X$, said temperature Tc is found.

7. A processing method for substrates according to claim 5, wherein:

said constant of proportionality M (° C./deg) is a constant of proportionality expressing the slope of a straight line found from a plurality of combinations (X, $\Delta T$) of the temperature difference $\Delta T$ between said temperature Th of said mounting table and a temperature Td of said substrates before curing and the deflection X of the substrates after curing by irradiation of a curing light, and is found in advance.

8. A processing method for substrates according to claim 5, wherein:

said constant of proportionality M (° C./deg) is a constant of proportionality expressing the slope of a straight line found from a plurality of combinations (X, $\Delta T$) of the temperature difference $\Delta T$ between said temperature Th of said mounting table and a temperature Td of said substrates before curing and the deflection X of the substrates after curing by irradiation of a curing light, and a warping of said substrates is adjusted while finding said constant of proportionality M by updating said combination (X, $\Delta T$) as necessary.

9. A processing method for substrates, comprising:

a step in which substrates before curing are mounted on a mounting table, said substrates having a plurality of individual substrates and an uncured photo-curable adhesive layer interposed between these individual substrates;

a step in which substrates after curing are obtained wherein, while said substrates before curing are mounted on said mounting table, said individual substrates are bonded together by photo-curing said adhesive layer by irradiating said substrates before curing with photo-curing light; and a step in which a deflection X of said substrates after curing is controlled by controlling at least one of said substrates before curing and said mounting table;

a step in which said deflection X is controlled comprises;

a step in which a temperature Td of said substrates before curing is found;

a step in which a target deflection Xt and said deflection X are calculated, and a deflection difference $\Delta X$ is found;

a step in which a temperature Tc is found by carrying out a calculation of Tc= Td+M$\times\Delta X$ by using a constant of proportionality M determined by a correlation between the temperature Td of said substrates before curing and said deflection X; and a step in which a temperature control of the temperature of said substrates before curing is carried out according to temperature Tc.

10. A processing method for substrates according to claim 9, comprising a step in which a compensated value $\Delta X'$, which is said deflection difference $\Delta X$ that has been compensated according to conditions that include the tendency of said deflection difference $\Delta X$, is found, and where this compensated value $\Delta X'$ serves as the value of said deflection difference $\Delta X$, said temperature Tc is found.

11. A processing method for substrates according to claim 9, wherein:

said constant of proportionality M (° C./deg) is a constant of proportionality expressing the slope of a straight line found from a plurality of combinations (X, $\Delta T$) of the temperature difference $\Delta T$ between a temperature Th of said mounting table and said temperature Td of said substrates before curing and the deflection X of the substrates after curing by irradiation of a curing light, and is found in advance.

12. A processing method for substrates according to claim 9, wherein:

said constant of proportionality M (° C./deg) is a constant of proportionality expressing the slope of a straight line found from a plurality of combinations (X, $\Delta T$) of the temperature difference $\Delta T$ between a temperature Th of said mounting table and said temperature Td of said substrates before curing and the deflection X of the substrates after curing by irradiation of a curing light, and a warping of said substrates is adjusted while finding said constant of proportionality M by updating said combination (X, $\Delta T$) as necessary.

13. A processing method for substrates according to any of claims 1, 5, and 9, wherein said constant of proportionality M is 15 to 40 (° C./deg).

14. A processing method for substrates according to any of claims 2, 6, and 10, wherein said deflection difference $\Delta X$ is compensated by carrying out PID control.

15. A processing method for substrates according to any of claims 1, 5, and 9, wherein said deflection X is an average deflection Xa that expresses the average value of a predetermined number n of said substrates after curing.

16. A processing method for substrates according to claim 15, wherein said average deflection Xa of said substrates after curing is a value obtained by averaging deflections within a predetermined allowable range among the deflections X of a predetermined number n of substrates after curing.

17. A processing method for substrates according to claim 15, wherein said temperature of said mounting table and said substrates before curing is maintained without change while the average deflection Xa of said substrates after curing is within a predetermined deflection range (Xt±an arbitrary numerical value $\alpha$).

18. A processing method for substrates according to claim 15, wherein a moving average value (average value of the n most recent substrates) of the predetermined number n of said substrates after curing is found while the average deflection Xa of said substrates after curing is within a predetermined deflection range (Xt±an arbitrary numerical value α).

19. A processing method for substrates according to claim 15, wherein, when the average deflection Xa of said substrates after curing is outside a predetermined deflection range (Xt± an arbitrary numerical value α), said temperature of said mounting table and said substrates before curing is calculated and temperature control of said mounting table and said substrates before curing is carried out at this calculated temperature, and the measurement of the deflection of the predetermined number n substrates after curing is newly carried out, and until this measurement is completed, temperature control of said mounting table and said substrates before curing is carried out using said calculated temperature.

20. A processing method for substrates, comprising:
  a step in which substrates before curing are mounted on a mounting table, said substrates having a plurality of individual substrates and an uncured photo-curable adhesive layer interposed between these individual substrates;
  a step in which substrates after curing are obtained wherein, while said substrates before curing are mounted on said mounting table, said individual substrates are bonded together by photo-curing said adhesive layer by irradiating said substrates before curing with photo-curing light; and
  a step in which a deflection X of said substrates after curing is controlled by controlling at least one of said substrates before curing and said mounting table;
  said step in which said deflection X is controlled comprises:
  a step in which the relationship (Th−Td=M×X+a) is found, where a constant of proportionality determined by a correlation of at least two combinations of a temperature difference ΔT between a temperature Th of said mounting table and a temperature Td of said substrates before curing and said deflection X is denoted M, a temperature difference ΔT between the temperature Th of said mounting table and the temperature Td of said substrates before curing when the deflection X of said substrates after curing is zero is denoted a; and
  a step in which a temperature control of at least one of said substrates after curing and said mounting table is carried out such that Th−Td=M×Xt+a, where a deflection setting value is denoted Xt.

* * * * *